(12) United States Patent
Suzuki et al.

(10) Patent No.: US 6,789,949 B2
(45) Date of Patent: Sep. 14, 2004

(54) ROLLER BEARING HAVING STREAKED GRINDING TRAIL ON ROLLER END FACE

(75) Inventors: Akiyuki Suzuki, Kashihara (JP); Hiroki Matsuyama, Kitakatsuragi-gun (JP); Yasunari Abo, Kitakatsuragi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/147,214

(22) Filed: May 15, 2002

(65) Prior Publication Data

US 2002/0181820 A1 Dec. 5, 2002

(30) Foreign Application Priority Data

May 16, 2001 (JP) .................................... P2001-146162
Feb. 8, 2002 (JP) .................................... P2002-031926

(51) Int. Cl.$^7$ ............................................. F16C 19/36
(52) U.S. Cl. ........................ 384/462; 384/564; 384/569; 384/571
(58) Field of Search .................... 384/564, 565, 384/571, 569, 462

(56) References Cited

U.S. PATENT DOCUMENTS

| | | |
|---|---|---|
| 5,503,481 A | 4/1996 | Hashimoto et al. |
| 5,967,672 A | 10/1999 | Akamatsu et al. |
| 6,033,123 A | 3/2000 | Sato et al. |

FOREIGN PATENT DOCUMENTS

| | | |
|---|---|---|
| GB | 364 234 | 1/1932 |
| JP | 7-42746 | 2/1995 |
| JP | 10-110733 | 4/1998 |
| WO | WO99/13235 | 3/1999 |

*Primary Examiner*—Lenard A. Footland
(74) *Attorney, Agent, or Firm*—Jordan and Hamburg LLP (57) ABSTRACT

A tapered roller bearing in which tapered rollers are interposed between an inner ring member and an outer ring member and a large diameter flange having a guide surface guiding a large diameter side end face of a tapered roller is provided in an end portion in an axial direction of the inner ring member. Microscopic streaked grinding trails are arranged in multiple directions on the large diameter side end face of the tapered roller.

19 Claims, 10 Drawing Sheets

(RADIAL ROUGHNESS CURVE)

FIG. 13

(CIRCUMFERENTIAL ROUGHNESS CURVE)

FIG. 14

(RADIAL ROUGHNESS CURVE)

FIG. 15

(CIRCUMFERENTIAL ROUGHNESS CURVE)

FIG. 16
PRIOR ART

ROLLER BEARING HAVING STREAKED GRINDING TRAIL ON ROLLER END FACE

FIELD OF THE INVENTION

The present invention relates to a roller bearing, and more particularly to a direction of a streaked grinding trail left on a roller end face at a time of grinding the roller end face.

BACKGROUND OF THE INVENTION

A tapered roller bearing is structured such that a plurality of tapered rollers are interposed between an inner ring member and an outer ring member, a flange having a guide surface guiding end faces of the tapered rollers in a slide contact is provided in an end portion in an axial direction of the inner ring member, and they are lubricated by a lubricating agent such as an oil, a grease or the like. When grinding the end faces of the tapered rollers and the guide surface of the flange of the inner ring member, a streaked grinding trail is left thereon. A description will be given of the streaked grinding trail with reference to FIG. 16. A reference symbol 4A denotes an end face of a tapered roller, and a reference symbol 8 denotes a guide surface of a flange of an inner ring member. Streaked grinding trails lay of roughness T1 are left on the end surface 4A in a circumferential direction so as to form a number of concentric circles. Streaked grinding trails lay of roughness T2 in a circumferential direction are left on the guide surface 8 of the inner ring member 3.

Figure 16:
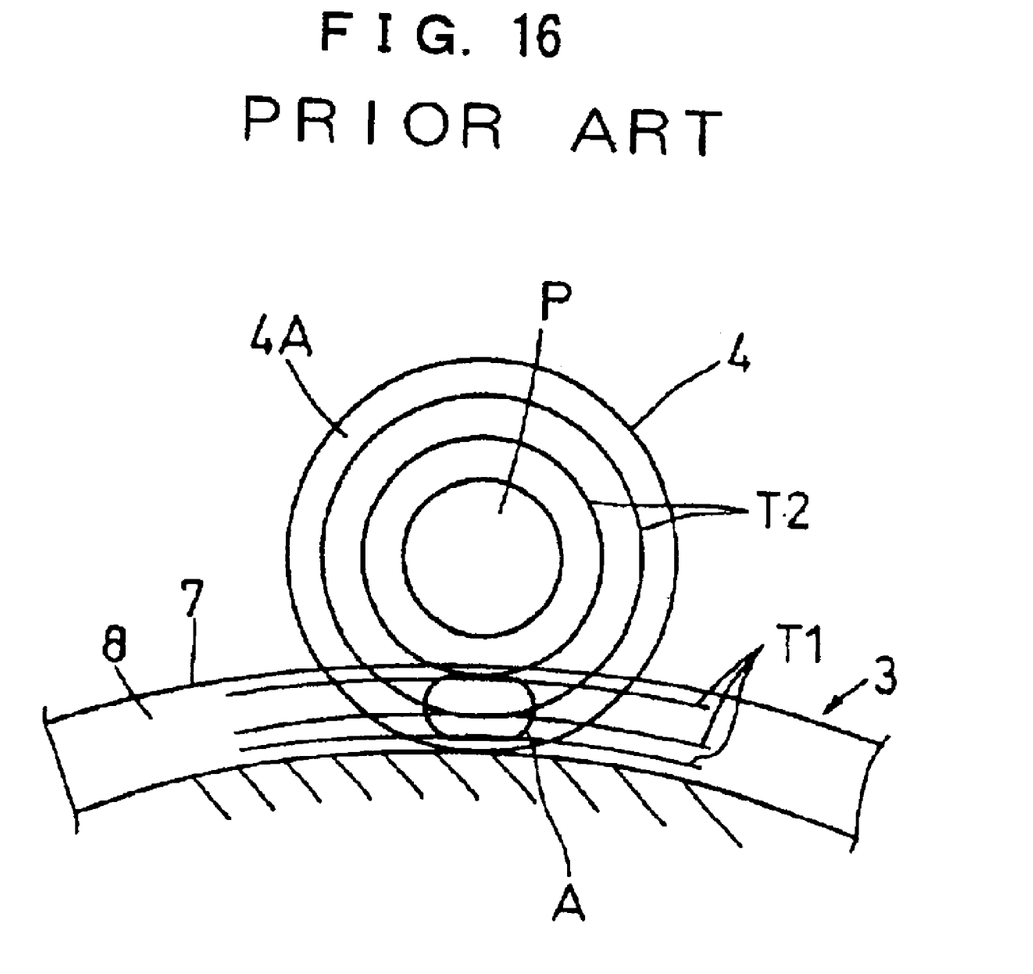
FIG. 16 is a front elevational view showing streaked grinding trails lay of roughness in each of a roller and a flange in accordance with the conventional art.

When the streaked grinding trails lay of roughness T1 and T2 are left in the state mentioned above, it is hard for the end face 4A of the tapered roller to form a lubricating oil film due to a lack of lubricating oil content in a slide contact portion A between the end face 4A and the guide surface 8 of the inner ring member at a time of a high load or a high speed rotation. Further, there is a risk that a lack or a seizure of the lubricating oil film is generated.

SUMMARY OF THE INVENTION

Accordingly, a main object of the present invention is to provide a roller bearing which improves a seizure resisting property at a time of being rotated at a high load and a high speed.

The other objects, features and advantages of the present invention will be apparent from the following description.

In short, the present invention is as follows.

A roller bearing of the present invention includes an inner ring member, an outer ring member concentrically arranged in an outer side in a diametrical direction of the inner ring member, and a plurality of rollers provided between the inner ring member and the outer ring member so as to freely roll, wherein a flange having a guide surface guiding end faces of the rollers in a slide contact is provided in an end portion in an axial direction of at least one of the inner ring member and the outer ring member, and a number of microscopic streaked grinding trails lay of roughness are left on the end faces of the rollers in multiple directions.

In accordance with the roller bearing of the present invention, since a number of microscopic streaked grinding trails lay of roughness are left in multiple directions on the end faces which is in slide contact with the guide surfaces of the flanges in the rollers, a lubricating film is easily formed in the slide contact portion between the guide surfaces and the roller end faces, so that the lubricating oil film is hardly broken. Subsequently, since a metal contact is hardly generated in the slide contact portion, and a heat generation is restricted, a trouble such as a seizure or the like is restricted and a seizure resisting property is improved therewith.

The above-mentioned term "microscopic" means that a depth of unevenness of the streaked grinding trail is from a sub $\mu$m to a $\mu$m order. Further, the term 'multiple directions' mentioned above includes two or more different directions which are different from a circumferential direction. Further, the mutual relation of directions may be provided with a regularity or not provided therewith. Further, the streaked grinding trail includes a recess groove striation, and an aspect of the striation includes a curve aspect, a linear aspect, the all other streaked aspects, or combined aspects thereof, and does not depend upon a change of the streaked width or aspect thereof.

The roller bearing in accordance with the present invention may have a number of microscopic streaked grinding trails lay of roughness left on the guiding surfaces of the flanges in multiple directions. In this case, since the streaked grinding trails lay of roughness of the guide surfaces are left in the multiple directions in the same manner, an oil film forming capacity becomes high, so that a problem such as the seizure or the like is restricted. In particular, since the tapered roller bearing provided with the flanges which makes a slide contact with the large diameter side end face flanges in the inner ring member is frequently used under a condition in which the flange guide surfaces and the roller end faces are in contact with each other due to a high load, it is extremely hard to form the lubricating oil film in this contact portion, and the problem such as the seizure or the like is easily generated. Accordingly, in the tapered roller bearing, it is preferable to form the streaked grinding trails lay of roughness on the large diameter side end faces of the tapered rollers or on the guide surfaces of the inner ring member being in slide contact with the roller large diameter side end faces in multiple directions. Since the streaked grinding trails lay of roughness on the large diameter side end faces of the tapered rollers are formed in the multiple directions, whereby the lubricating oil film is easily formed between the contact surfaces in the slide contact with the guide surfaces of the flanges, the structure is made such that the lubricating oil film is not broken or does not become thin between the contact surfaces. Accordingly, the structure is made such that it is possible to prevent the lubricating oil film from being broken and the problem such as the seizure or the like is not generated. Further, it is preferable the microscopic streaked grinding trails lay of roughness left on the roller end faces are left in multiple directions under a condition satisfying the following formula (1):

$$\gamma = L2/L1 \leq 2.5 \quad (1)$$

in which, $\gamma$: surface pattern parameter of the roller end face, L1: a correlation length of roughness in a radial direction on the roller end face, and L2: a correlation length of roughness in a circumferential direction on the roller end face. The correlation length herein corresponds to a length until a auto-correlation coefficient becomes 0.5. The streaked grinding trails lay of roughness are structured such as to be provided with a multi-directivity defined quantitatively by the formula (1) mentioned above, whereby as is apparent from test results, it is possible to restrict a deviation of directions of the streaked grinding trails lay of roughness on the roller end faces at a time of grinding, it is possible to keep the oil film forming capacity high at a time when a lubricating environment in the roller end face is deteriorated, and it is possible to greatly improve a seizure resisting property of the roller bearing.

BRIEF DESCRIPTION OF THE DRAWINGS

These and other objects as well as advantages of the invention will become clear by the following description of preferred embodiments of the invention with reference to the accompanying drawings, wherein.

DETAILED DESCRIPTION OF PREFERRED EMBODIMENTS

A description will be given below of details of the present invention on the basis of an embodiment shown in the drawings.

Figure 1:
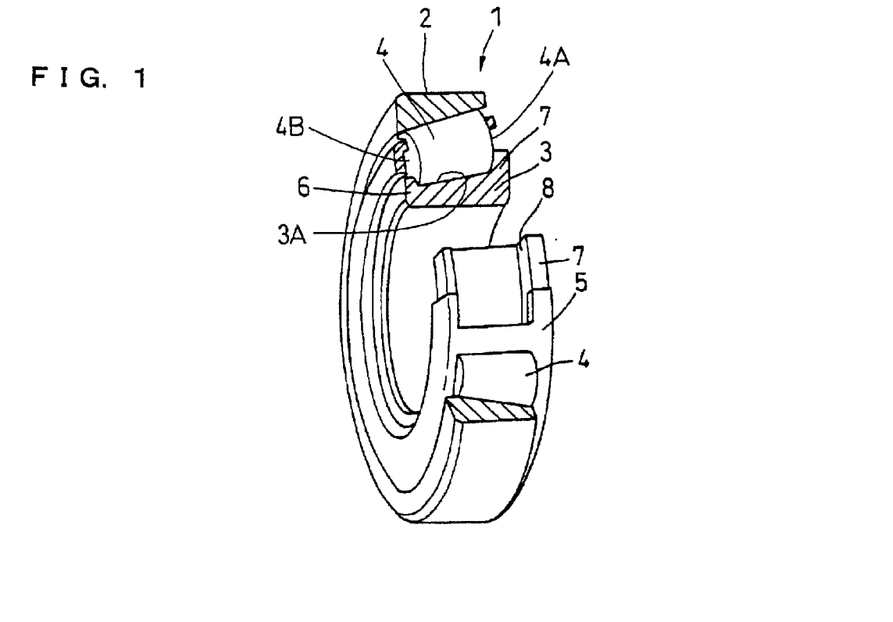
FIG. 1 is a perspective view showing a tapered roller bearing in a partly broken manner in accordance with an embodiment of the present invention.

With reference to FIG. 1, a tapered roller bearing 1 has an outer ring member 2, an inner ring member 3, a plurality of tapered rollers 4 assembled in a state of being interposed between the outer ring member 2 and the inner ring member 3, and a cage 5 holding respective tapered rollers 4.

The tapered rollers 4 and both of the members 2 and 3 are lubricated by oil, grease or the like.

The inner ring member 3 is structured such that a cross section is formed in a tapered trapezoidal shape, an inner ring raceway track 3A is provided on an outer peripheral surface thereof, and a small diameter flange 6 and a large diameter flange 7 are respectively formed on a tapered end edge portion (small diameter side) and a flared end edge portion (large diameter side) in both sides in an axial direction of the inner ring raceway track 3A.

The small diameter flange 6 holds the tapered roller 4, while the large diameter flange 7 receives an axial load generated by the tapered roller 4, and structured in such that a large diameter side end face 4A of each of the tapered rollers 4 is guided by a guide surface 8 in a slide contact state. The tapered roller 4 has a tapered trapezoidal shape having the large diameter side end face 4A and a small diameter side end face 4B.

Figure 2:
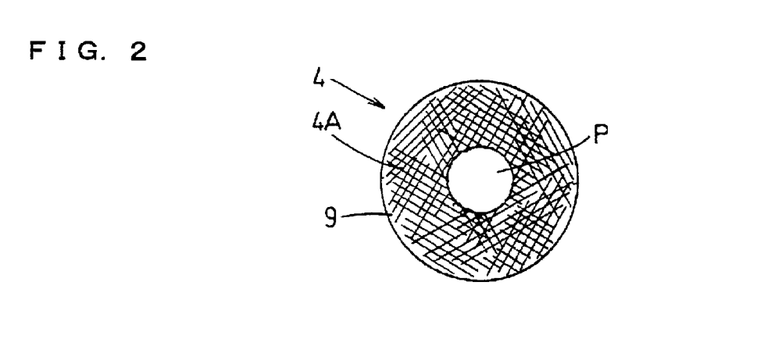
FIG. 2 is a front elevational view of a large diameter side end face of a tapered roller in FIG. 1.

With reference to FIG. 2, a number of streaked grinding trails lay of roughness 9 having a microscopic streaked shape are left in the large diameter side end face 4A of the tapered roller 4 in multiple directions. A circular shallow recess P is formed at a time of forming an outer shape of the tapered roller 4 is formed in a center portion of the large diameter side end face 4A. No grinding process is applied to the recess P.

Since a number of microscopic streaked grinding trails lay of roughness 9 are left in multiple directions of the large diameter side end face 4A of the tapered roller 4, it is possible to prevent the streaked grinding trails lay of roughness along a circumferential direction of the flange 7 and streaked grinding trails lay of roughness 9 in multiple directions of the large diameter side end face 4A of the tapered roller 4 from making a frictional contact with each other in a parallel or a substantially parallel state at a frictionally contact portion, even when the streaked grinding trails lay of roughness on the guide surface 8 in the flange 7 of the inner ring member 3 are formed in a circumferential direction.

Accordingly, the streaked grinding trails lay of roughness on the guide surface 8 in the flange 7 of the inner ring member 3, and the streaked grinding trails lay of roughness 9 on the large diameter side end face 4A of the tapered roller 4 always intersect at the contact portion. As a result, a flow of a lubricating agent is restricted at the contact portion, whereby an oil keeping property is improved. Due to such a high oil keeping property, it is possible to keep an oil film forming capacity high even in the case that a lubricating condition is not good, whereby heat generation together with friction becomes low and it is possible to restrict a problem such as a seizure or the like.

A description will be given of a method of forming a number of microscopic streaked grinding trails lay of roughness 9 on the large diameter side end face 4A of the tapered roller 4 mentioned above with reference to FIG. 3. The tapered roller 4 is ground, for example, by repeatedly applying a contact for grinding and a retraction from the contact position to a grinding application surface 11 in a grinding disc-like grind stone 10 every significantly short times and rotating the tapered roller 4 at a fixed speed at that time.

Figure 3:
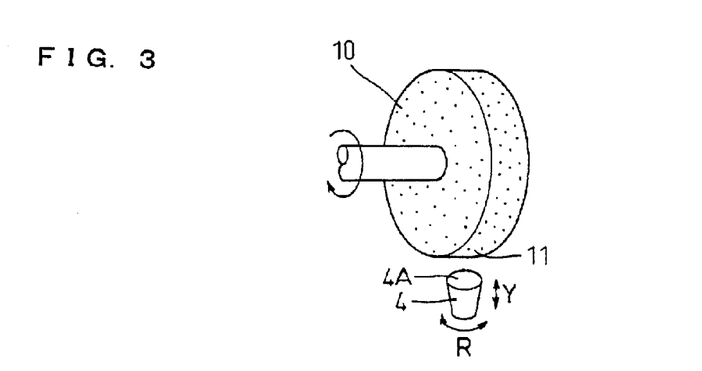
FIG. 3 is an idiomatic view used in an explanation of a method of grinding a tapered roller end face.

Describing in detail, the tapered roller 4 is rotated at a predetermined speed by opposing the large diameter side end face 4A of the tapered roller 4 to the grinding application surface 11 of the grind stone 10 in such a manner as to move close thereto and apart therefrom (oscillate along a Y direction in FIG. 3) in a state of supporting the tapered roller 4 by a supporting device (not shown) such as a chuck or the like, and rotating the supporting device around an axis of the tapered roller 4 at a predetermined speed without changing the opposing state in which the grinding application surface 11 and the large diameter side end face 4A become parallel (rotating in a fixed direction in which an R direction in FIG. 3 is set to a circumferential direction). Further, the supporting device is moved in the Y direction controlled by a control means provided in a grinding machine, the large diameter side end face 4A of the tapered roller 4 comes in contact with the grind stone 10 for a significantly short time so as to be ground, and the supporting device is immediately retracted from the grinding position. These operations are repeated. Accordingly, as well as the tapered roller 4 rotates in the manner mentioned above on the large diameter side end face 4A of the tapered roller 4, the large diameter side end face 4A of the tapered roller 4 is ground in a state in which the grinding direction of the grind stone 10 on the large diameter side end face 4A is in multiple directions. Therefore, a number of microscopic streaked grinding trails lay of roughness 9 are left by abrasive powders of the grind stone 10 on the large diameter side end face 4A of the tapered roller 4 in multiple directions so as to form recess groove trails, as shown in FIG. 2.

Figure 4:
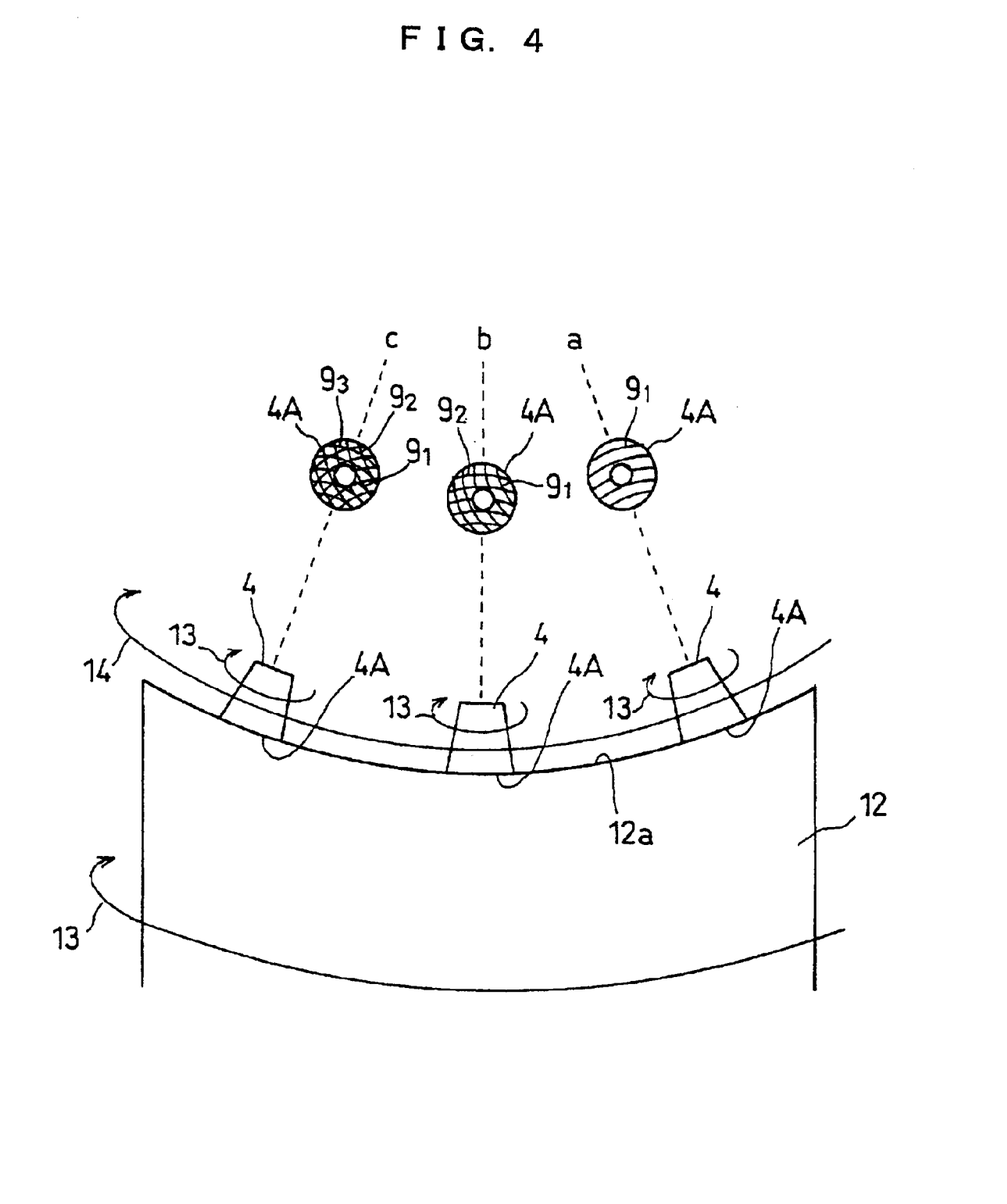
FIG. 4 is an idiomatic view used in an explanation of another method of grinding a tapered roller end face.

A description will be given of another grinding method for leaving the streaked grinding trails lay of roughness 9 with reference to FIG. 4. A grinding process axis 12 rotates on its own axis at a predetermined rotational speed in a direction of an arrow 13. An end face 12a of the process axis 12 constitutes a grinding process surface (grind stone surface) formed in a predetermined recess curve surface. The tapered roller 4 is transferred in a direction of an arrow 14 in the drawing while rotating on its own axis in the direction of the arrow 13 in a state in which the large diameter side end face 4A revolves in contact with the end face 12a along the end face 12a of the process axis 12.

Firstly, when the tapered roller 4 is at a transfer position a, the large diameter side end face 4A is ground by the grinding process surface 12a of the grinding process axis 12, and a streaked grinding trail $9_1$ is left in a first direction by this grinding. Secondly, when the tapered roller 4 is at a transfer position b, a streaked grinding trail $9_2$ is left in the same manner in a second direction which is different from the first direction on the large diameter side end face 4A. Further, when the tapered roller 4 is at a transfer position c, a streaked grinding trail $9_3$ is left in the same manner in a third direction which is different from the first direction and the second direction on the large diameter side end face 4A. As mentioned above, since the large diameter side end face 4A of the tapered roller 4 is ground in the process of transfer in a direction of an arrow 14, the streaked grinding trails lay of roughness 9 having a number of microscopic shapes are left in multiple directions due to the grinding.

The aspect of the streaked grinding trails lay of roughness 9 in this case is set to three directions with respect to three transfer positions a, b and c of the tapered roller 4, for convenience of explanation. Actually, since both of the tapered roller 4 and the grinding process axis 12 rotate on their own respective axis, a number of streaked grinding trails lay of roughness 9 intersect to each other and are left in a mesh state substantially uniformly on the whole of the large diameter side end face 4A of the tapered roller 4 in each of multiple directions. Further, it is possible to finish so as to have a predetermined roller end face roughness by suitably setting a grinding condition such as a shape of the grinding process surface, a kind of the grind stone, a rotational number of the grinding process axis, a rotational number of the roller autorotation, a revolving speed, a contact force between the roller end face and the process surface or the like.

Figure 5:
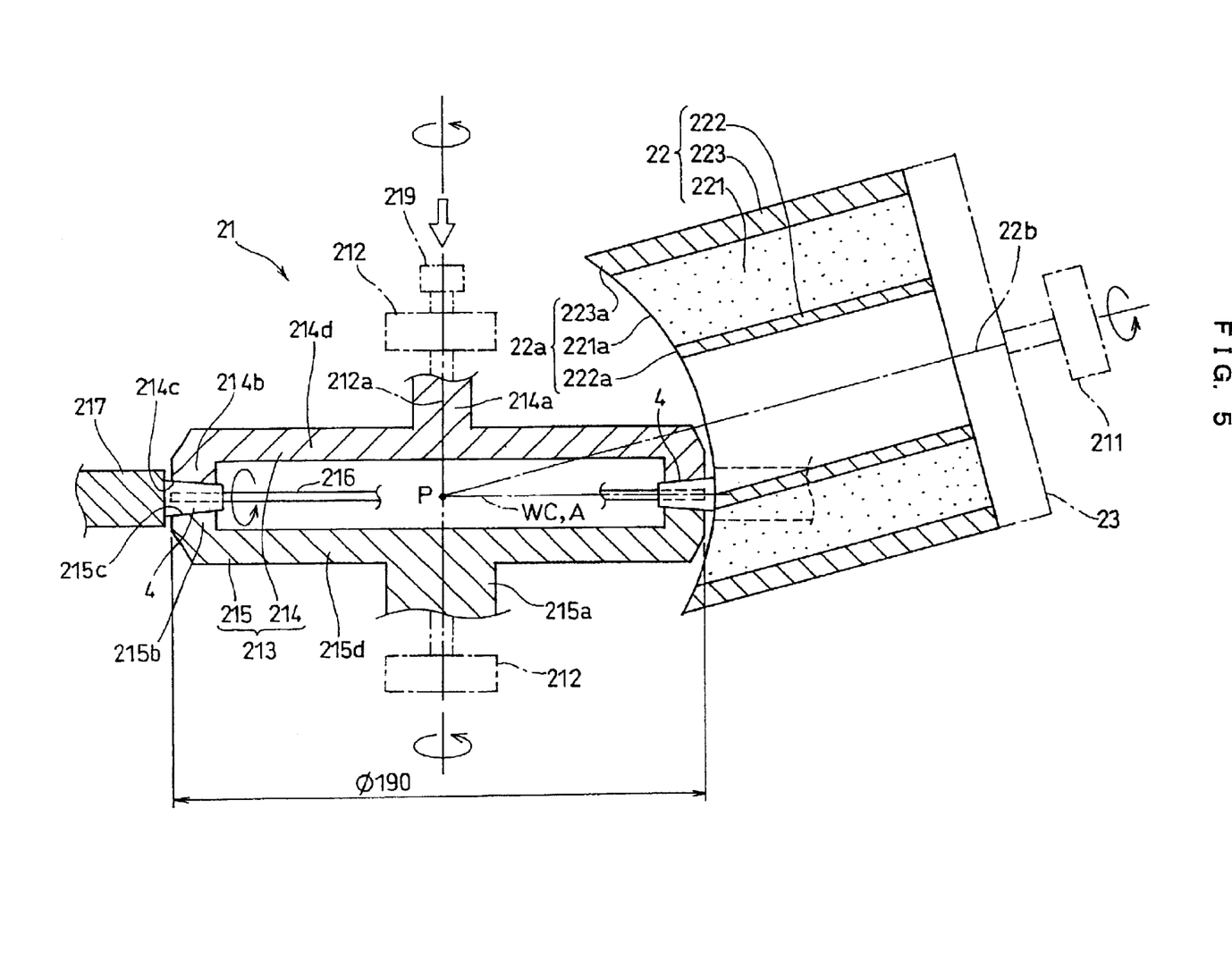
FIG. 5 is a schematic view of an outlined structure of a grinding apparatus utilizing an abrasive wheel.

A description will be given of a grinding using an abrasive wheel with reference to FIG. 5. A grinding apparatus 21 is structured such as to grind a large end face of the tapered roller for the tapered roller bearing into a convex curve surface comprising a spherical surface, and forms a substantially tapered trapezoidal tapered roller. The grinding apparatus 21 has an abrasive wheel 22 mentioned above which is rotated and driven around a center axis 22b by a first drive means 211, and a holding body 213 which is rotated and driven around a rotational axis 212a intersecting the center axis 22b by a second drive means 212 so as to hold a plurality of tapered rollers 4. The holding body 213 includes a pair of discs 214 and 215 rotating around the rotational axis 212a. These discs 214 and 215 respectively have disc-shaped main body portions 214d and 215d, shaft portions 214a and 215a extending along the rotational axis 212a from a center portion of the elements 214d and 215d so as to be drive connected to the second drive means 212, and annular protruding portions 214b and 215b disposed in outer peripheral edges of the main body portions 214d and 215d and reverse protruding so as to move close to each other. Mutually opposing end faces of the annular protruding portions 214b and 215b constitute holding surfaces 214c and 215c, and are structured such as to hold a plurality of tapered rollers 4 constituted by the tapered rollers between the holding surfaces 214c and 215c. The holding surfaces 214c and 215c are constituted by tapered taper surfaces inclined in opposite directions to each other, and are in contact with a circumferential surface constituted by the tapered surface of the tapered roller 4.

Center axes W of a plurality of tapered rollers 4 held between the holding surfaces 214c and 215c are radially arranged around an intersecting point P between a plane A orthogonal to the rotational axis 212a and the rotational axis 212a, within the plane A. A plurality of tapered rollers 4 are restricted regarding an interval in a circumferential direction, on a circular arc within the plane A around the intersecting point P mentioned above, by a cage 216, for example, constituted by a shaft extending through a center hole thereof, and for example, are held in a circumferentially uniform interval.

The large end faces of the tapered rollers 4 are directed outward in radial directions of the discs 214 and 215, and are arranged at predetermined radial positions. A circle passing through the radial positions and included in the plane A around the intersecting point P is structured such as to pass substantially along the end face 22a of the abrasive wheel 22, particularly through an inner peripheral edge portion of an end face 222a. The center axis 22b of the abrasive wheel 22 is structured such as to cross the intersecting point P. A pair of second drive means 212 are provided so as to respectively drive a pair of discs 214 and 215. A pair of discs 214 and 215 hold a plurality of tapered rollers 4 in such a manner as to freely rotate on its own axis around a center axis WC of the tapered roller 4, and relatively rotate, thereby making a plurality of tapered rollers 4 rotate on its own axis due to a generated circumferential speed difference between the holding surfaces 214c and 215c. The circumferential speed difference mentioned above is set so as to revolve the tapered rollers 4 around the rotational axis 212a. Each of the tapered rollers 4 is fed in an F direction on a circular feeding track 218 constituted by a revolving track of the tapered roller.

Figure 6:
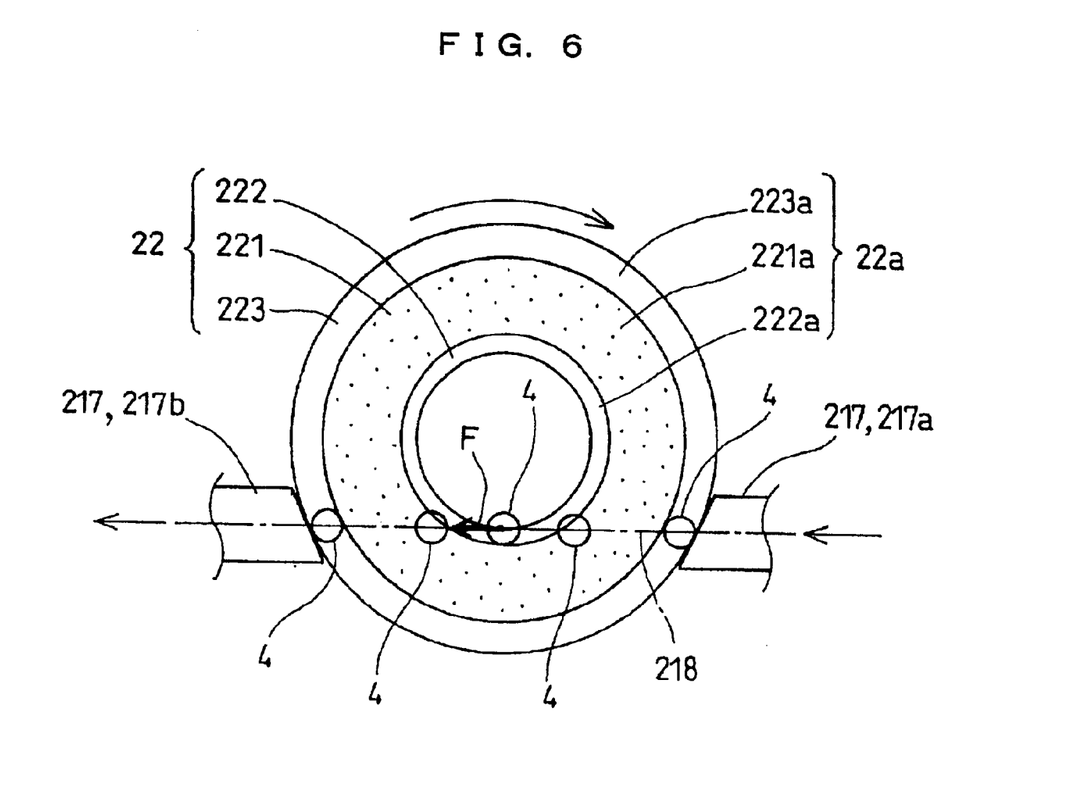
FIG. 6 is a view of the abrasive wheel as seen from the end face side.

As shown in FIG. 6, the tapered roller is fed along the end face 22a of the abrasive wheel 22 so that the large end face of the tapered roller is ground in a partial area of the feeding track 218 (which is curved in a perpendicular direction to a paper surface in FIG. 6), and is guided in a remaining area of the feeding track 218 by a tapered roller guide 217. The tapered roller guide 217 has a shape in which a part of an annular shape is notched, an inner peripheral surface thereof is placed close to an outer peripheral portion of the holding body 213, and the large end surface of the tapered roller 4 is arranged along the inner peripheral surface thereof.

A pair of discs 214 and 215 are energized by an energizing means 219 so as to move close to each other, and press the large end face of the tapered roller to the end face 22a of the abrasive wheel 22 and the tapered roller guide 217 by of taper surfaces of the holding surfaces 214c and 215c. In this grinding apparatus 21, when rotating the abrasive wheel 22, an abrasive wheel main body 221, an inner guide 222 and an outer guide 223 integrally rotate. The tapered roller is fed along the feeding track 218 while rotating on its own axis. In the mean while, it is possible to press the tapered roller to the end face 22a of the abrasive wheel 22 so as to apply a convex curve surface shape to the tapered roller by the grinding surface 221a.

An unlubricated seizure test corresponding to a poor lubrication condition is applied to the embodiment product provided with the tapered roller 4 in which the streaked grinding trails lay of roughness 9 are left by the grinding method, and the conventional product, and a small quantity lubricated test is further applied thereto. A description will be given of the test condition.

Both of the conventional product and the embodiment product employ a tapered roller bearing having an inner diameter 45 mmϕ, an outer diameter 100 m,ϕ and a width 38.25 mm.

A specification of the conventional product is as follows.

The guide surface 8 in the large diameter side flange 6 of the inner ring member 3 is ground in a state in which concentric streaked grinding trails lay of roughness are left by a grinding process, and is formed so as to have 0.44 μm in a ten-point average roughness Rz. With respect to a surface roughness of the large diameter side end face 4A of the tapered roller 4, the streaked grinding trails lay of roughness are left so as to form the concentric circles, by a through feed working machine, and a directivity parameter γ of roughness is 14.

A specification of the embodiment product is as follows.

A roughness of the guide surface 8 in the large diameter side flange 6 of the inner ring member 3 is set to the same as the conventional product mentioned above.

A roughness of the large diameter side end face 4A in the tapered roller 4 is ground in a state in which the grinding process trails in multiple directions are left, by the method mentioned above, and the directivity parameter γ of roughness is set to 0.62. A particular process condition at this time comprises the inner guide 222 of the abrasive wheel 2: 50 mmϕ, the outer guide 223 of the abrasive wheel 2: 130 mmϕ, the energizing means 219: applied pressure 350 kg, the tapered roller: rotating speed 4 rpm, the first drive means 211: 2500 rpm, the second drive means 212 (an upper side in FIG. 5): 280 rpm (190 mmϕ), and the second drive means 212 (a lower side in FIG. 5): 270 rpm (190 mmϕ). An abrasive material employs a generally used one, for example, an alumina series abrasive grain or the like, and a binding agent employs a generally used one such as a resin series bond or the like.

Figure 7:
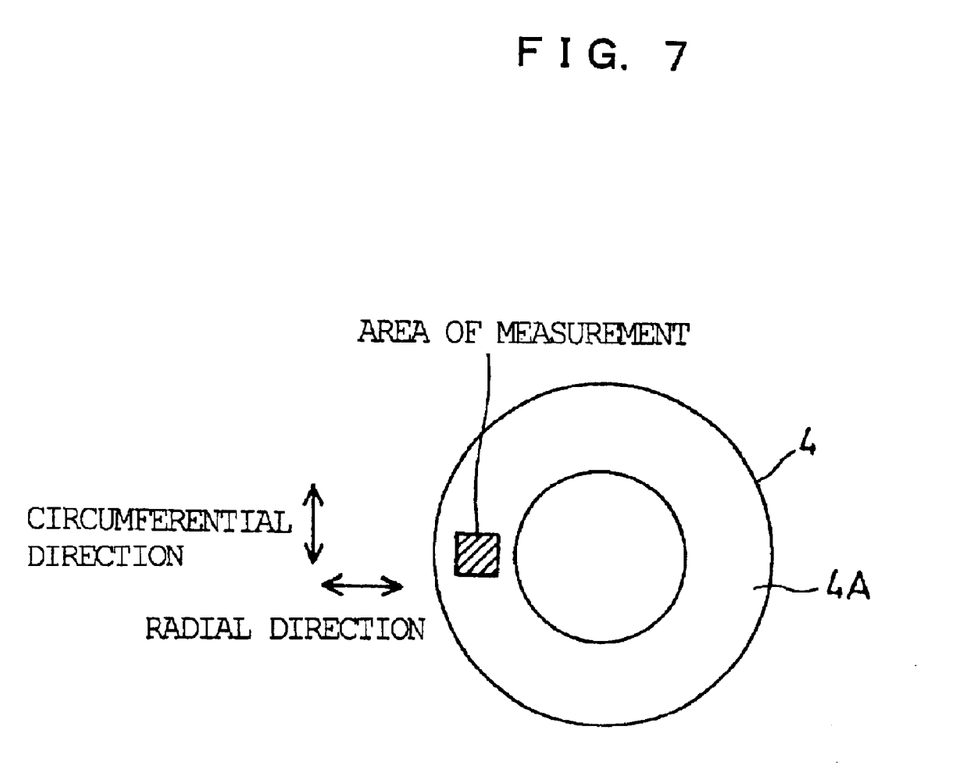
FIG. 7 is a plan view of the large diameter side end face of the tapered roller used in an explanation of measurement of three-dimensional surface roughness.

In this case, the roughness mentioned above is measured by the following method by using a TALYSCAN 150 manufactured by Tayler Hobson corresponding to a three-dimensional surface roughness measuring device. This is shown in FIG. 7. FIG. 7 shows the large diameter side end face 4A of the tapered roller 4.

Position of measurement: position shown in FIG. 7 on the large diameter side end face 4A of the tapered roller 4, * the tapered roller is fixed to a sample table by a jig such as a socket or the like.

Size of measurement: 0.8 mm in radial direction×0.8 mm in a circumferential direction

* 0.5 mm×0.5 mm or more in the case that the tapered roller 4 is too small to be measured in the size mentioned above     Interval of measurement: 5 μm in both of a radial direction and a circumferential direction     Speed of scan: 1000 mm/s     Roughness filter: Gausian filter     Length of cut-off: 0.25 mm In the measurement mentioned above, ① the sample table moves in an X direction (corresponding to a radial direction)→a stylus (sensing pin) scans in parallel to the X direction, ② the sample table moves in a Y direction (corresponding to a circumferential direction) for every scan in the X direction, ③ a data acquisition is completed by repeating the operations ① and ② mentioned above, ④ raw data is leveled and a spherical shape is removed, and ⑤ a swell component is removed and a roughness component is extracted.

The parameter γ mentioned above is calculated by the following method.

A auto-correlation function is determined on the basis of the surface roughness obtained by the method mentioned above (auto-correlated is executed in accordance with an analysis software (Talymap)).

A profile in a radial direction is extracted on the basis of the obtained auto-correlation surface. At this time, a starting point of the profile is set to a center in the area of measurement. The auto-correlation curve of roughness in the radial direction can be obtained.

Since a value (that is, a maximum value) of the auto-correlation function at an origin is 1, a value of the auto-correlation function in the case of a depth 0.5 becomes 0.5 by setting a vertical axis of a graph to a depth from the maximum height. Then, a length from the origin to a auto-correlation coefficient=0.5 is read and is set to L1.

In the same manner, a auto-correlation curve in a circumferential direction is introduced, and a correlation length L2 in the circumferential direction is read.

γ=L2/L1 is determined.

With respect to the embodiment product and the conventional product, the unlubricated seizure test is applied to three conventional products and two embodiment products, and a small quantity lubricated test is applied to respective two conventional products and embodiment products. This test is executed by assembling a pair of tapered roller bearings in a testing machine (not shown) in a back to back aspect. Further, in both of the tapered roller bearings, the inner ring member 3 is rotated by the testing machine.

Unlubricated Seizure Test

Figure 8:
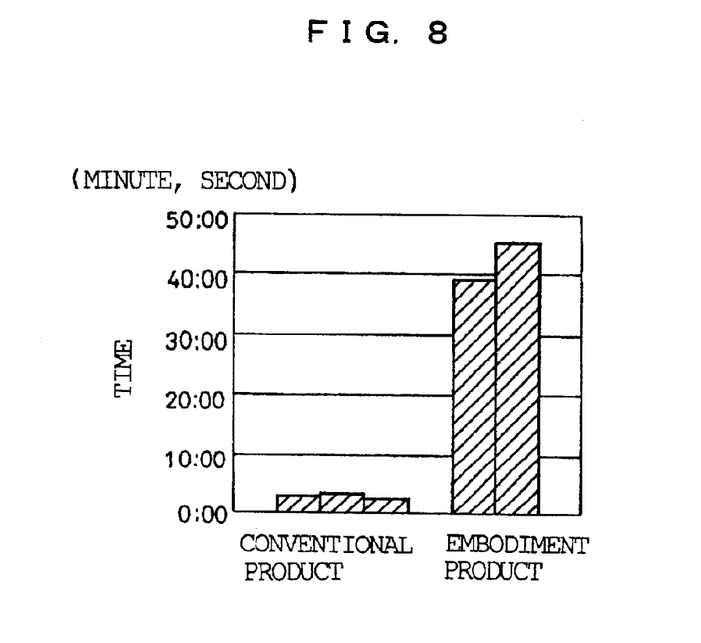
FIG. 8 is a view showing a result of an unlubricated seizure test applied to the large diameter side end faces of the respective tapered rollers in a product of the embodiment and a conventional product.

A rotational speed of the inner ring member 3 is set to 3800 r/min. The rotational speed is achieved within 15 seconds. An axial load Fa of 8 KN is applied to the outer ring member 3. A lubrication is assembled in the testing machine after applying a gear oil (SAE85W-90) to an inner ring assembly such as the large diameter side end face 4A of the tapered roller 4, the guide surface 8 of the large diameter side flange 6 in the inner ring member 3 and the like, is left for 10 minutes, and is operated after leaving. Both of an oil temperature of the gear oil and a room temperature are set between 18 and 19° C. When the rotation of the inner ring member 3 is locked or a spark is generated, it is judged that a seizure is generated. A result of the unlubricated seizure test is shown in FIG. 8. A vertical axis in FIG. 8 indicates a time (unit: minute or second) until the seizure. As is apparent from FIG. 8, under the same rotational speed, the same axial load Fa and the same lubricating condition, the seizure is generated within some minutes in all three of the conventional products, however, the seizure is generated after forty minutes or more time has passed, in both of two embodiment products. That is, the embodiment product has a seizure resisting property substantially ten times or more than the conventional product.

Small Quantity Lubricated Test

Figure 9:
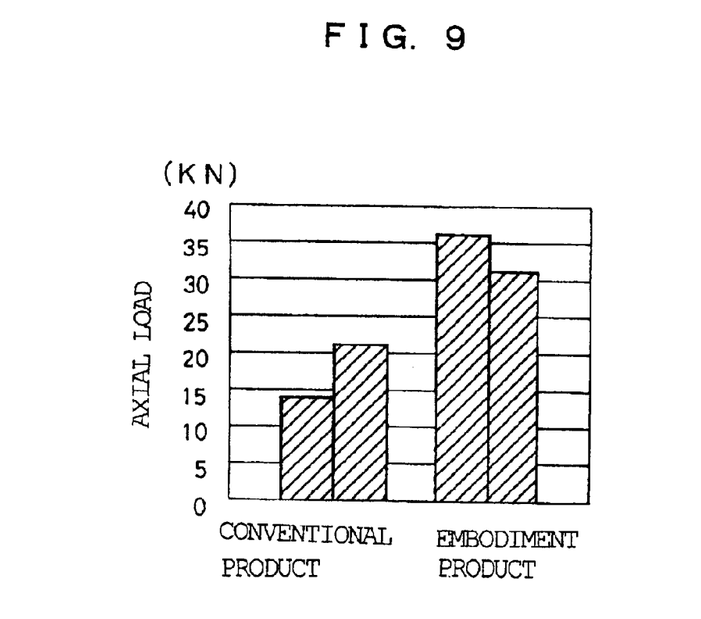
FIG. 9 is a view showing a result of a small quantity lubricated seizure test applied to the large diameter side end faces of the respective tapered rollers in the product of the embodiment and the conventional product.

A rotational speed of the inner ring member 3 is set to 3800 r/min. The axial load Fa of 10 KN is applied to the outer ring member 2 by stepping up 1 KN by 1 KN. A holding time of 1 step at each of step-ups of the axial load Fa at this time is set to five minutes. A lubrication drips the gear oil (SAE85W-90) to the large diameter side flange 7 of the inner ring member 3 at 3 ml per minute. An oil temperature of the gear oil is set between 18 and 19° C. at a test time. When the rotation of the inner ring member 3 is locked, a spark is generated, or the temperature of the bearing is excessively increased (200° C.), it is judged that a seizure is generated. A result of the small quantity lubricated test is shown in FIG. 9. A vertical axis in FIG. 9 indicates an axial load Fa (unit:KN) at a time of the seizure. As is apparent from FIG. 9, when increasing the axial load Fa under the same rotational speed and the same lubricating condition, the seizure is generated at a time when the axial load Fa is increased to about 14 to 21 KN in all three of the conventional products, however, the seizure is first generated at a time when the axial load Fa is increased to 31 to 36 KN or more, in both of two embodiment products. That is, the embodiment product has a seizure resisting property substantially 1.9 times or more than the conventional product.

As is apparent from the test result mentioned above, the embodiment product can widely restrict the seizure of the large diameter side end face 4A of the tapered roller 4 and the guide surface of the inner ring member in comparison with the conventional product, in both of the unlubricated and the small quantity lubricated.

By leaving a number of microscopic streaked grinding trails lay of roughness 9 on the large diameter side end face 4A of the tapered roller 4 in multiple directions in the manner mentioned above, it is possible to restrict the seizure of the large diameter side end face 4A. A description will be in detail given below of multiple directions with reference to FIGS. 10 to 15.

Figure 10:
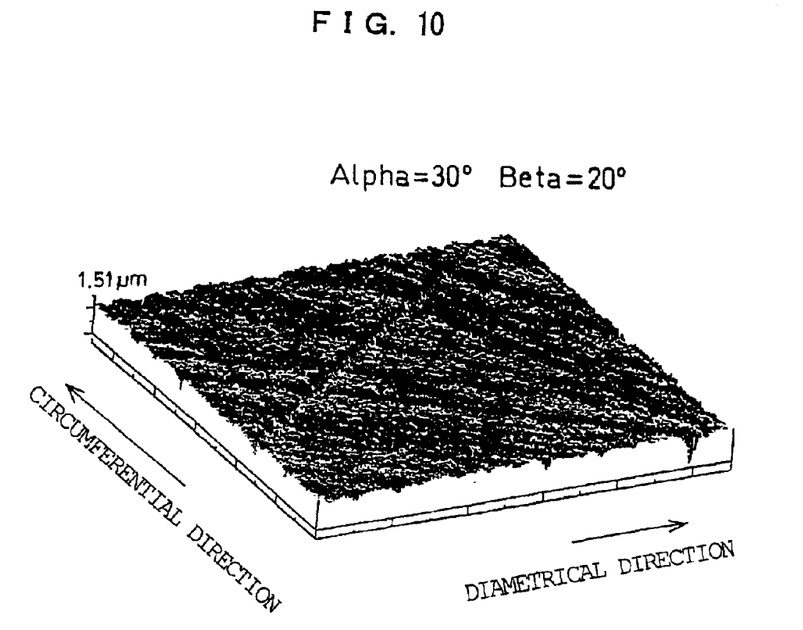
FIG. 10 is a perspective view showing a enlarged part of the tapered roller end face provided in the tapered roller bearing in accordance with the embodiment of the present invention.
Figure 11:
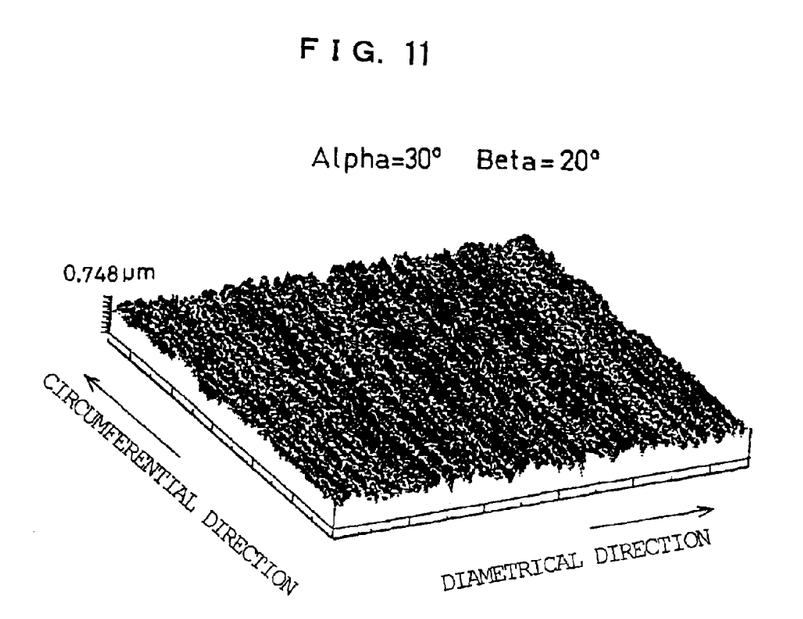
FIG. 11 is a perspective view showing a part of the tapered roller end face provided in the tapered roller bearing in accordance with the conventional art in an enlarged manner.

FIG. 10 shows a part of the large diameter side end face 4A of the tapered roller of the present embodiment (the embodiment product) in which a number of microscopic streaked grinding trails lay of roughness 9 are left in multiple directions due to the grinding mentioned above. The embodiment product in FIG. 10 is obtained by applying a three-dimensional surface roughness measurement in a size of 0.8 mm×0.8 mm to the surface of the large diameter side end face 4A, removing the spherical shape and thereafter three-dimensionally displaying the roughness surface after removing the swell component by the Gausian filter (cut-off 0.25 mm). FIG. 11 shows the large diameter side end face 4A of the conventional tapered roller 4 (the conventional product) in which a number of microscopic streaked grinding trails lay of roughness in the circumferential direction are left, for the purpose of comparing with the embodiment product.

The conventional product in FIG. 11 is also obtained by applying the three-dimensional surface roughness measurement in the size of 0.8 mm×0.8 mm to the surface of the large diameter side end face 4A, removing the spherical shape and thereafter three-dimensionally displaying the roughness surface after removing the swell component by the Gausian filter (cut-off 0.25 mm). As is apparent by comparing FIG. 10 with FIG. 11, in the embodiment product, a number of microscopic streaked grinding trails lay of roughness 9 are left on the large diameter side end face 4A in multiple directions, however, in the conventional product, a number of microscopic streaked grinding trails lay of roughness 9 are concentrically left on the large diameter side end face 4A only in a substantially circumferential direction. In this case, reference numeral of the streaked grinding trails lay of roughness 9 is not described in FIGS. 10 and 11.

Figure 12:
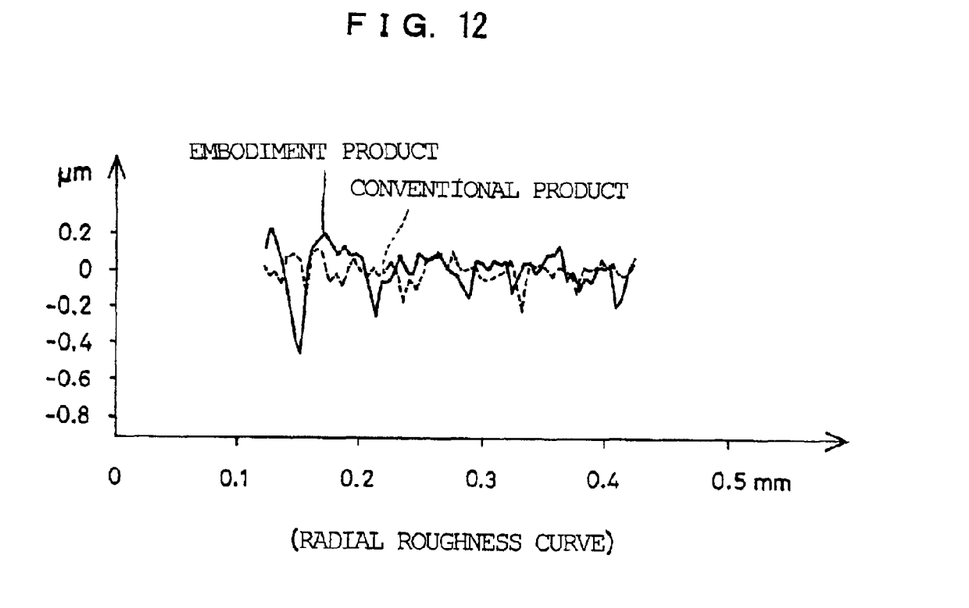
FIG. 12 is a view showing a roughness curve in a radial direction of the large diameter side end face of the tapered roller in each of the product of the embodiment and the conventional product.

In FIG. 12, a solid line shows a roughness curve in the radial direction of the large diameter side end face 4A of the tapered roller in the embodiment product, and a broken line shows a roughness curve in the radial direction of the large diameter side end face 4A of the tapered roller in the conventional product. In FIG. 12, a vertical axis indicates a roughness ($\mu$m), and a horizontal axis indicates a distance (mm) in the radial direction. In FIG. 12, a small difference in the roughness curve exists between the embodiment product in which the streaked grinding trails lay of roughness 9 are left in multiple directions, and the conventional product in which the streaked grinding trails lay of roughness 9 are left only in the substantially circumferential direction.

Figure 13:
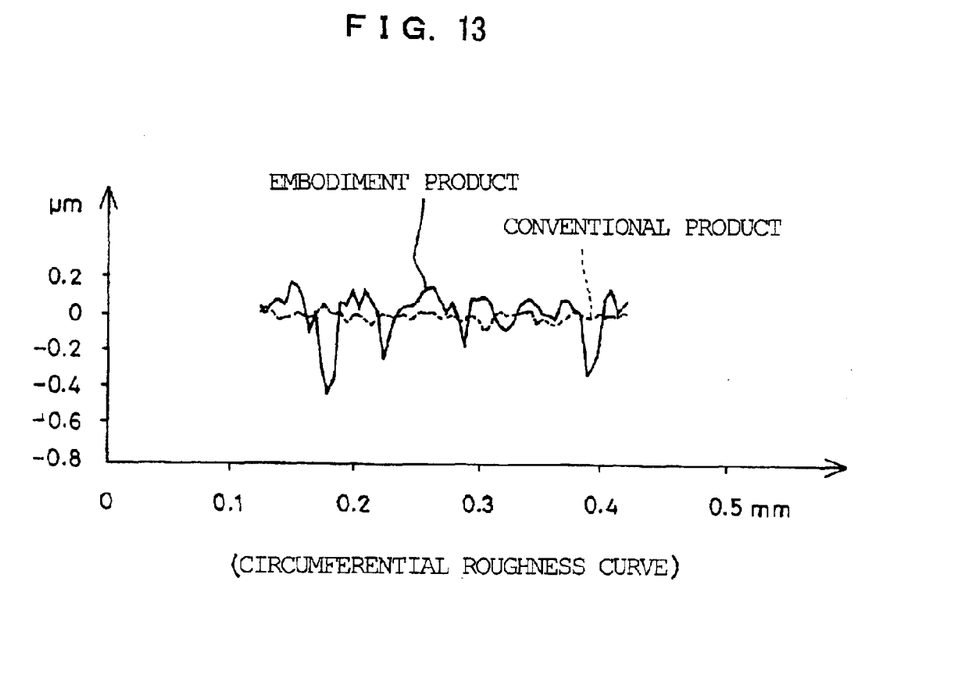
FIG. 13 is a view showing a roughness curve in a circumferential direction of the large diameter side end face of the tapered roller in each of the product of the embodiment and the conventional product.

On the contrary, in FIG. 13, a solid line shows a roughness curve in the circumferential direction of the large diameter side end face 4A in the embodiment product, and a broken line shows a roughness curve in the circumferential direction of the large diameter side end face 4A in the conventional product. In FIG. 13, a vertical axis indicates a roughness ($\mu$m), and a horizontal axis indicates a distance (mm) in the circumferential direction. FIG. 13 shows a large difference in the roughness curve exists between the embodiment product in which the streaked grinding trails lay of roughness 9 are left in multiple directions, and the conventional product in which the streaked grinding trails lay of roughness 9 are left only in the substantially circumferential direction. In the case of the embodiment product, a depth of valley in the circumferential direction is changed in the same manner as that in the radial direction, however, in the conventional product, the depth of valley in the circumferential direction is hardly changed.

As is apparent from a comparison between FIGS. 12 and 13, in the case of the embodiment product, since the streaked grinding trails lay of roughness 9 in the large diameter side end face 4A are formed in multiple directions, the roughness curves in the radial direction and the circumferential direction of the large diameter side end face 4A are both structured such that an amplitude difference between peaks and valleys becomes large in their directions. On the contrary, in the case of the conventional product, since the streaked grinding trails lay of roughness 9 on the large diameter side end face 4A are formed only in the substantially circumferential direction, the roughness curve in the radial direction of the large diameter side end face 4A is structured such that an amplitude difference between peaks and valleys is large in their directions, however, the roughness curve in the circumferential direction has a small amplitude difference between peaks and valleys in their directions.

Figure 14:
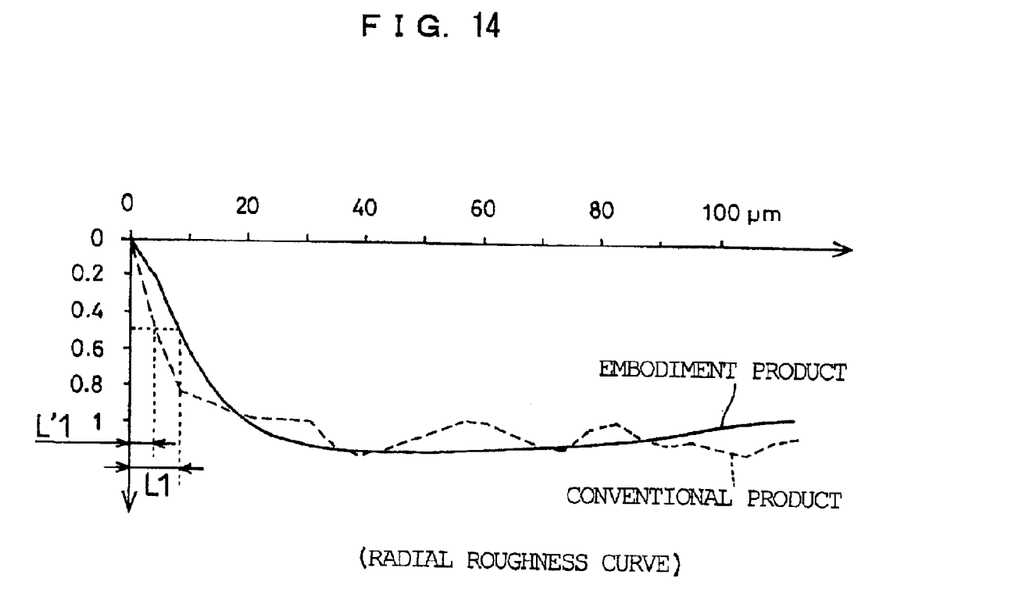
FIG. 14 is a view showing a correlation length in a radial direction of the large diameter side end face of the tapered roller in each of the product of the embodiment and the conventional product.

In FIG. 14, a solid line shows a auto-correlation curve in the radial direction of the large diameter side end face 4A in the embodiment product, and a broken line shows a auto-correlation curve in the radial direction of the large diameter side end face 4A in the conventional product. In FIG. 14, a vertical axis indicates a auto-correlation coefficient, a horizontal axis indicates a wavelength (mm). In FIG. 14, reference symbol L1 denotes a auto-correlation coefficient of the embodiment product, and reference symbol L1' denotes a auto-correlation coefficient of the conventional product. In FIG. 14, a small difference exists between the embodiment product in which the streaked grinding trails lay of roughness 9 are left in multiple directions, and the conventional product in which the streaked grinding trails lay of roughness 9 are left only in the substantially circumferential direction. Accordingly, a difference between L1 and L1' is small.

In this case, a description will be given of a correlation length. That is, an average $R(\lambda)$ of a product of a roughness curve $f(x)$ and a value $f(x+\lambda)$ obtained by a distance $\lambda$ shifting is expressed by the following formula.
[Formula 1]

$$R(\lambda) = \lim_{L \to \infty}(1/L)\int_0^L f(x)f(x+\lambda)dx$$

The formula 1 is called as a auto-correlation function. Further, a distance until a value of this auto-correlation function $R(\lambda)$ is reduced to $1/e$ of a value of $R(0)$. This can be used as an interval between projections or a parameter of a shape of a projection top portion. Further, $X(\lambda)=R(\lambda)/R(0)$ obtained by normalizing $R(\lambda)$ by $R(0)=\sigma^2=R^2rms$ is called as a auto-correlation coefficient (Tribology, under joint authorship with Yuji Yamamoto and Sadahiro Kamata, Science and Engineering Co., Ltd (1998)). "X" in the formula mentioned above is a letter pronounced as "kai".

Since the conventional roughness parameter defined in JIS (Japan Industrial Standard) only one-dimensional property of the surface, in order to quantitatively define the multi-directivity which is important in the present invention, it is unavoidable to use a parameter indicating a directivity of microscopic shape of the surface having two-dimensional expanse. In general, as a parameter indicating a directivity of roughness, the following parameters defined by Peklenik are used (Peklenik, J.: "New Developments in Surface Characterization and Measurements by Means of Random Process Analysis", Proc. Instn. Mech. Engrs., Vol. 182, Pt. 3K (1967–68) 108–126).

$$\gamma = \lambda_{0.5x}/\lambda_{0.5y}$$

In this case, $\lambda_{0.5x}$ and $\lambda_{0.5y}$ are respectively lengths at which the auto-correlation function $X(\lambda)$ obtained from the roughness curves in the x direction and the y direction is reduced to one half, that is, average wavelengths corresponding to $X(\lambda)=0.5$, and are called as correlation lengths. At this time, when setting x to a direction in which the oil flows, and setting y to a direction orthogonal thereto, the directivity of the roughness is judged as follows.

at a time of $\gamma>1$ ($\lambda_{0.5x}>\lambda_{0.5y}$) the direction of the roughness is in parallel to the oil flowing direction (parallel roughness)

at a time of $\gamma<1$ ($\lambda_{0.5x}<\lambda_{0.5y}$), the direction of the roughness is orthogonal to the oil flowing direction (orthogonal roughness)

$\gamma=1$ ($\lambda_{0.5x}=\lambda_{0.5y}$) no directivity exists in the roughness Accordingly, the parameter expressing the directivity of the roughness of the roller end face can be given in the manner mentioned below.

$$\gamma = L2/L1$$

In this case, L1 is a correlation length of the roughness in the radial direction, and L2 is a correlation length of the roughness in the circumferential direction.

Figure 15:
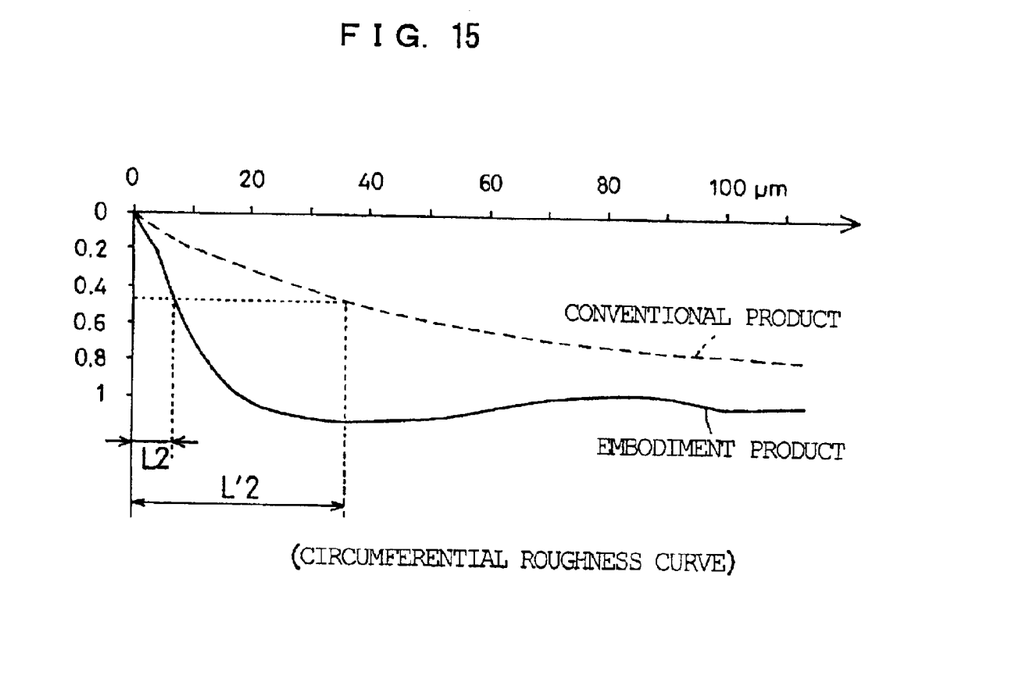
FIG. 15 is a view showing a correlation length in a circumferential direction of the large diameter side end face of the tapered roller in each of the product of the embodiment and the conventional product.

In FIG. 15, a solid line shows a auto-correlation curve in the circumferential direction of the large diameter side end face 4A in the embodiment product, and a broken line shows a auto-correlation curve in the circumferential direction of the large diameter side end face 4A in the conventional product. In FIG. 15, a vertical axis indicates a auto-correlation coefficient, a horizontal axis indicates a wavelength (mm). In FIG. 15, reference symbol L2 denotes a auto-correlation coefficient of the embodiment product, and reference symbol L2' denotes a auto-correlation coefficient of the conventional product. In FIG. 15, a large difference exists between the embodiment product in which the streaked grinding trails lay of roughness 9 are left in multiple directions, and the conventional product in which the streaked grinding trails lay of roughness 9 are left only in the substantially circumferential direction. In particular, a difference between L2 and L2' is large, which is absolutely different from the relation between L1 and L1' mentioned above.

As is apparent by comparing FIG. 14 with FIG. 15, in the embodiment product, since the streaked grinding trails lay of roughness 9 on the large diameter side end face 4A are formed in multiple directions, the roughness curves in the radial direction and the circumferential direction of the large diameter side end face 4A are changed in the substantially same manner with respect to the wavelength. On the contrary, in the case of the conventional product, since the streaked grinding trails lay of roughness 9 on the large diameter side end face 4A are formed only in the substantially circumferential direction, the auto-correlation curve in the radial direction of the large diameter side end face 4A is largely different from the auto-correlation curve in the circumferential direction.

On the basis of the experimental results, $\gamma$ defined by using L1, L1', L2 and L2' mentioned above is employed as a method of quantitatively expressing the difference of the microscopic shape between both of the surfaces.

Further, as a result of conducting the experiment mentioned above in a state of variously changing the directivity parameter y of roughness, it has been identified that a seizure resisting property is effectively improved if the streaked grinding trails lay of roughness 9 are left in multiple directions which satisfies the following formula (1).

$$\gamma = L2/L1 \leq 2.5 \tag{1}$$

In this case, L1 is a correlation length of the roughness in the radial direction on the large diameter side end face 4A, and L2 is a correlation length of the roughness in the circumferential direction on the large diameter side end face 4A. In this case, the correlation length here is a length until the auto-correlation coefficient x(λ) of the roughness in the respective directions becomes 0.5.

In this case, λ mentioned above preferably satisfies a relation $0.4 \leq \gamma = L2/L1 \leq 2.5$. When γ is greater than 2.5, the roughness direction becomes close to parallel to the oil flowing direction, so that the effect mentioned above is not significant. When it is smaller than 0.4, no problem is generated in theory, however, no actual effect is recognized. In more preferable, $0.4 \leq \gamma = L2/L1 \leq 1.2$ is established.

In this case, a range of the directivity parameter γ of the roughness defining the multi directivity of the streaked grinding trails lay of roughness 9 is determined as the formula (1) on the basis of the experimental result, however, a description will be given of a reason why the multi directivity of the streaked grinding trails lay of roughness 9 can widely restrict the seizure.

When the tapered roller 4 rotates, the oil is going to move in a circumferential direction of the large diameter side end face 4A of the tapered roller 4, in the contact portion between the large diameter side end face 4A and the guide surface 8 of the inner ring member 3. At this time, in the case that the directivity parameter γ of the roughness is smaller than 1 as in the present invention, and the direction of the roughness intersects the oil flowing direction, the oil is easily held within the contact area due to a strong application in the direction of restricting the oil flow by an effect of unevenness, so that a thicker oil film is formed between the large diameter side end face 4A of the tapered roller 4 and the flange guide surface 8 of the inner ring member 3. A direct metal contact of the contact surface is reduced due to the effect of improving the oil film forming capacity, and an increase of friction and a heat generation are restricted, whereby the seizure resisting property is widely improved. On the contrary, in the case that 7 is larger than 1, and the direction of the roughness becomes in parallel to the oil flowing direction, the oil easily flows smoothly, and accordingly the oil held within the contact area relatively gets less, so that a thickness of the oil film formed in the contact portion is reduced. Further, when γ becomes large over the range shown by the formula (1) as in the conventional product, a defect of lubrication such as a local oil film break or the like is easily generated due to reduction of the oil film thickness caused by the reduction of oil holding property, so that there is a case that a part thereof reaches the seizure. Then, the range in the formula (1) mentioned above is defined by the experiment as the preferable range.

As is apparent from the description mentioned above, in accordance with the present embodiment, a number of streaked grinding trails lay of roughness 9 are left on the large diameter side end face 4A of the tapered roller 4 in multiple directions, whereby it is possible to widely restrict the seizure mentioned above.

In this case, the present invention can be also applied to the following embodiments.

In the embodiment mentioned above, there is shown the structure of grinding so that the streaked grinding trails lay of roughness 9 on the large diameter side end face 4A of the tapered roller 4 are formed in multiple directions, and grinding so that the streaked grinding trails lay of roughness on the guide surface 8 of the flange 7 are formed along the circumferential direction, however, the problems such as the seizure, the abrasion or the like can be restricted in the same manner by grinding the guide surface 8 of the flange 7 so that the ground process trails are formed in multiple directions.

Further, it is possible to grind so that the streaked grinding trails lay of roughness are formed on both of the end face and the guide surface in multiple directions.

In the embodiment mentioned above, there is shown the structure in which the inner ring member is set to the bearing ring and the flange is provided in the end portion thereof, however, the present invention may also be applied to a roller bearing in an aspect in which the outer ring member is set to the bearing ring and the flange is provided in the end portion thereof.

In the embodiment mentioned above, the description is given of the tapered roller bearing, however, the present invention can be applied to a roller bearing structured such that a columnar or barrel roller is interposed between the inner ring member and the outer ring member.

In this case, as well as the structure may be made such that the streaked grinding trails lay of roughness on the end faces at both ends of the roller, or the streaked grinding trails lay of roughness only on the end face in the side to which the load in the axial direction is strongly applied are formed in multiple directions, the structure may be made such that the streaked grinding trails lay of roughness on the guide surface of the flange provided in the axial end portion of the inner ring member or the outer ring member with which the end face of the roller is in slide contact are formed in multiple directions.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A roller bearing, comprising:

an inner ring member;

an outer ring member arranged concentrically with said inner ring member and around said inner ring member; and a plurality of rollers arranged between said inner ring member and said outer ring member, at least one of said inner ring member and said outer ring member having an end portion in an axial direction including a flange having a guide surface arranged to guide end faces of said rollers, and said end faces of said rollers including microscopic streaked grinding trails arranged in multiple directions including two or more different directions each of which is different from a circumferential direction, the microscopic streaked grinding trails on said end faces of said rollers being arranged in multiple directions under a condition satisfying the following formula (1);

$$\gamma = L2/L1 \leq 2.5 \qquad (1)$$

in which

γ surface pattern parameter of the roller end face,

L1: a correlation length of roughness in a radial direction on said end faces of said rollers, and L2: a correlation length of roughness in a circumferential direction on said end faces of said rollers, wherein the correlation length corresponds to a length until an auto-correlation coefficient becomes 0.5.

2. The roller bearing as claimed in claim 1, wherein said rollers are tapered rollers.

3. The roller bearing as claimed in claim 1, wherein said grinding trails are linear.

4. The roller bearing as claimed in claim 1, wherein said end faces of said rollers are in contact with said guide surface of said flange.

5. The roller bearing as claimed in claim 1, wherein said grinding trails are formed with regularity, that is, non-random.

6. A roller bearing, comprising:

an inner ring member;

an outer ring member arranged concentrically with said inner ring member and around said inner ring member, and a plurality of rollers arranged between said inner ring member and said outer ring member, at least one of said inner ring member and said outer ring member having an end portion in an axial direction including a flange having a guide surface arranged to guide end faces of said rollers, and said guide surface of said flange including microscopic streaked grinding trails arranged in multiple directions including two or more different directions each of which is different from a circumferential direction, said end faces of said rollers including microscopic streaked grinding trails in multiple directions, the microscopic streaked grinding trails on said end faces of said rollers being arranged in multiple directions under a condition satisfying the following formula (1):

$$\gamma = L2/L1 \leq 2.5 \tag{1}$$

in which,

γ: surface pattern parameter of the roller end face,

L1: a correlation length of roughness in a radial direction on said end faces of said rollers, and L2: a correlation length of roughness in a circumferential direction on said end faces of said rollers, wherein the correlation length corresponds to a length until an auto-correlation coefficient becomes 0.5.

7. The roller bearing as claimed in claim 6, wherein said rollers are tapered rollers.

8. The roller bearing as claimed in claim 6, wherein said cud faces of said rollers are in contact with said guide surface of said flange.

9. The roller bearing as claimed in claim 6, wherein said grinding trails are linear.

10. The roller bearing as claimed in claim 6, wherein said grinding trails are formed with regularity, that is, non-random.

11. A tapered roller beating, comprising:

inner ring member, an outer ring member arranged concentrically with said inner ring member and around said inner ring member, a plurality of tapered rollers arranged between said inner ring member and said outer ring member, said rollers having small diameter side end faces and large diameter side end faces; and a cage holding said plurality of tapered rollers between said inner ring member and said outer ring member, said inner ring member having an inner track on an outer peripheral surface in which said tapered rollers slide, said inner track being defined by a small diameter flange holding said tapered rollers in a small diameter side in an axial direction and a large diameter flange having a guide face guiding the large diameter side end faces of said tapered rollers in a large diameter side in the axial direction, and the large diameter side end faces of said tapered rollers having microscopic streaked grinding trails arranged in multiple directions including two or more different directions each of which is different from a circumferential direction and under condition satisfying the following formula (1):

$$\gamma = L2/L1 \leq 2.5 \tag{1}$$

in which,

γ: surface pattern parameter of the large diameter side end face of each of said tapered rollers, L1: a correlation length of roughness in a radial direction on the large diameter side end face of each of said tapered rollers, and L2: a correlation length of roughness in a circumferential direction on the large diameter side end face of each of said tapered rollers, wherein the correlation length corresponds to a length until an auto-correlation coefficient becomes 0.5.

12. The roller bearing as claimed in claim 11, wherein said large diameter side end faces of said rollers are in contact with said guide face of said large diameter flange.

13. The roller bearing as claimed in claim 11, wherein said grinding trails are formed with regularity, that is, non-random.

14. The roller bearing as claimed in claim 11, wherein said grinding trails are linear.

15. A tapered roller for a tapered roller bearing having a small diameter side end face and a large diameter side end face, wherein microscopic streaked grinding trails are arranged in multiple directions on said large diameter side end faces including two or more different directions each of which different from a circumferential direction and under a condition satisfying the following formula (1):

$$\gamma = L2/L1 \leq 2.5 \tag{1}$$

in which,

γ: surface pattern parameter of the large diameter side end face of the tapered roller, L1: a correlation length of roughness in a radial direction on the large diameter side end face of the tapered roller, and L2: a correlation length of roughness in a circumferential direction on the large diameter side end face of the tapered roller, wherein the correlation length corresponds to a length until an auto-correlation coefficient becomes 0.5.

16. The roller bearing as claimed in claim 15, wherein said grinding trails are linear.

17. The roller bearing as claimed in claim 15, wherein said grinding trails are formed with regularity, that is, non-random.

18. A roller bearing, comprising:

an inner ring member;

an outer ring member arranged concentrically with said inner ring member and around said inner ring member; and a plurality of rollers arranged between said inner ring member and said outer ring member, at least one of said inner ring member and said outer ring member having an end portion in an axial direction including a flange having a guide surface arranged to guide end faces of said rollers, and said end faces of said rollers including microscopic streaked grinding trails arranged in multiple directions including two or more different directions each of which is different from a circumferential direction, said grinding trails being formed with regularity, that is, non-random.

19. A roller bearing, comprising:

an inner ring member;

an outer ring member arranged concentrically with said inner ring member and around said inner ring member; and plurality of rollers arranged between said inner ring member and said outer ring member, at least one of said inner ring member and said outer ring member having an end portion in an axial direction including a flange having a guide surface arranged to guide end faces of said rollers, and said guide surface of said flange including microscopic streaked grinding trails arranged in multiple directions including two or more different directions each of which is different from a circumferential direction, said grinding trails being formed with regularity, that is, non-random.

* * * * *